US012147783B2

(12) United States Patent
Rao

(10) Patent No.: US 12,147,783 B2
(45) Date of Patent: Nov. 19, 2024

(54) PIPELINED HARDWARE TO ACCELERATE MODULAR ARITHMETIC OPERATIONS

(71) Applicant: International Business Machines Corporation, Armonk, NY (US)

(72) Inventor: Rajat Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 17/242,351

(22) Filed: Apr. 28, 2021

(65) Prior Publication Data

US 2022/0350570 A1 Nov. 3, 2022

(51) Int. Cl.
G06F 17/16 (2006.01)
G06F 7/544 (2006.01)
G06F 7/72 (2006.01)
H04L 9/30 (2006.01)

(52) U.S. Cl.
CPC ............ G06F 7/5443 (2013.01); G06F 7/725 (2013.01); H04L 9/3066 (2013.01)

(58) Field of Classification Search
CPC .................. G06F 17/16; G06F 7/5443; G06F 2207/4824; G06N 3/048
USPC ........................................ 708/200, 754, 757
See application file for complete search history.

(56) References Cited

U.S. PATENT DOCUMENTS 4,809,212 A * 2/1989 New ..................... G06F 7/5324
708/620
2004/0230631 A1 11/2004 Busaba et al.
2010/0172492 A1 7/2010 Lai et al.
2015/0006856 A1 1/2015 Rash et al.
2019/0004770 A1 1/2019 Satpathy et al.
2023/0108799 A1* 4/2023 Li ....................... G06F 7/49915
708/503

FOREIGN PATENT DOCUMENTS

CN 111767025 A 10/2020

OTHER PUBLICATIONS

Imran; "Throughput/area optimised pipelined architecture for elliptic curve crypto processor"; The Institution of Engineering and Technology; Feb. 2019; 8 pages.
Ma; "High-Speed Elliptic Curve Cryptographic Processor for Generic Curves over GF (p)"; Lecture Notes in Computer Science; vol. 8282; May 21, 2014; 25 p.
Sugiyama; "31.3 us/Signature-Generation 256-bit Fp ECDSA Cryptoprocessor"; IEEE Asian Solid-State Circuits Conference; Nov. 5-7, 2018/Tainan, Taiwan; 4p.
International Search Report; International Application No. PCT/IB2002/052580; International Filing Date: Mar. 22, 2022; Date of mailing: Jun. 28, 2022; 7 pages.

* cited by examiner

Primary Examiner — Tan V Mai
(74) Attorney, Agent, or Firm — CANTOR COLBURN LLP; Edward Wixted

(57) ABSTRACT

Embodiments are directed to elliptic curve cryptography scalar multiplications in a generic field with heavy pipelining between field operations. A bit width is determined of operands in data to be processed by a modular hardware block. It is checked whether the bit width of the operands matches a fixed bit width of the modular hardware block. In response to there being a match, the modular hardware block processes the operands. In response to there being a mismatch, the operands are modified to be accommodated by the fixed bit width of the modular hardware block.

20 Claims, 14 Drawing Sheets

FIG. 4

TABLE 1

| Require: k = bitwidth, a, b = operands, p = prime Return: r = (a * b) % p | Bitwidth calculations |
|---|---|
| 1. Calc (or input) $\mu = \text{floor} \frac{2^{2k}}{p}$ | $(2k+1) - k = k+1$ |
| 2. Binary mul    res = a * b | $k * k = 2k$ |
| 3. Binary mul    q2 = res(1 + hi) * $\mu$ | $(k+1) * (k+1) = 2k+2$ |
| 4. Binary mul    r2 = q2(1 + hi) * p | $(k+1) * k = 2k+1$ |
| 5. Binary sub    r = res(lo + 1) − r2(lo + 1) | $(k+1) - (k+1) = (k+1)$ |
| 6. Correct r − Add $2^{k+1}$ or subtract p or subtract 2p | $(k+1) \to k$ |

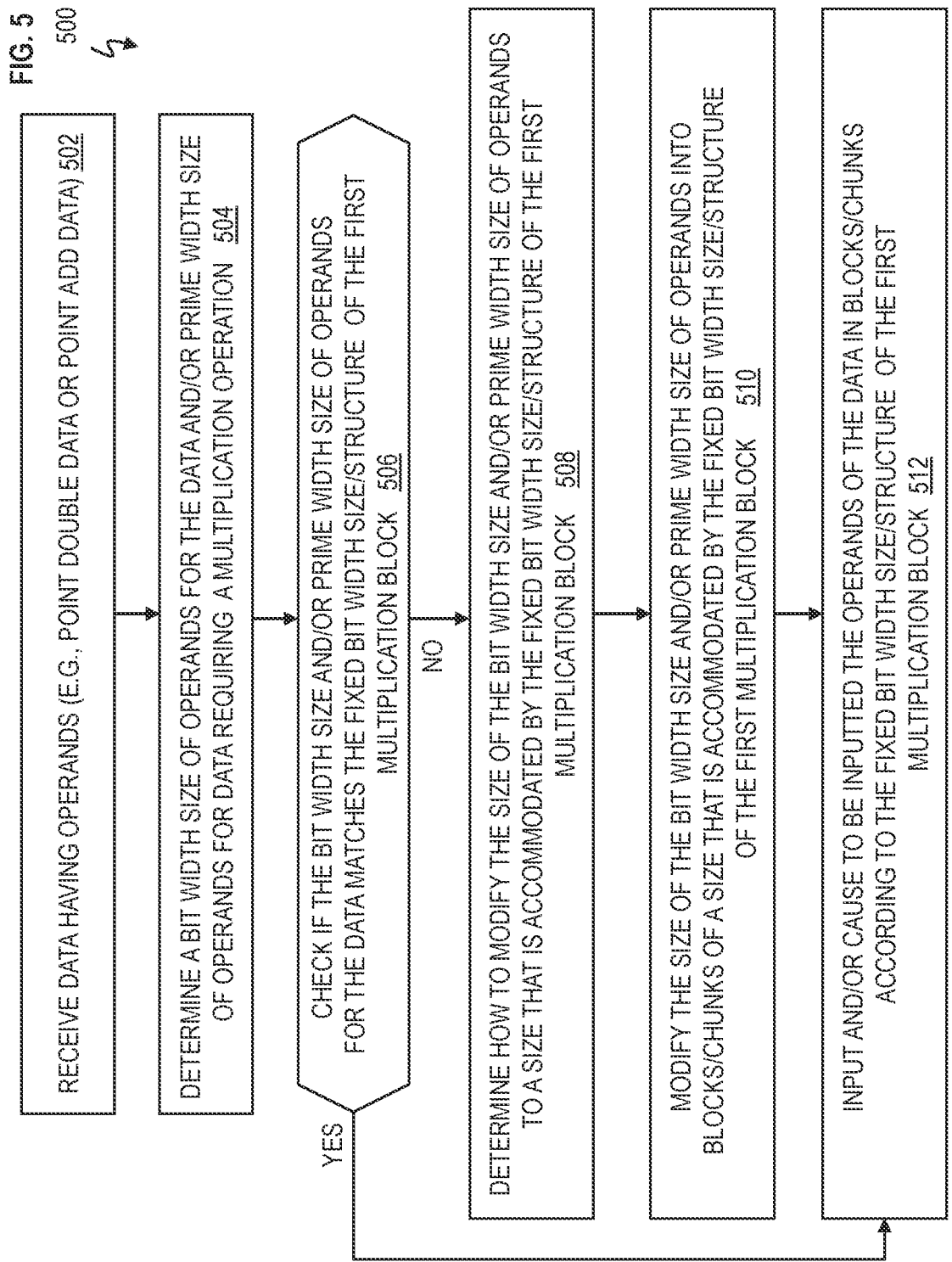

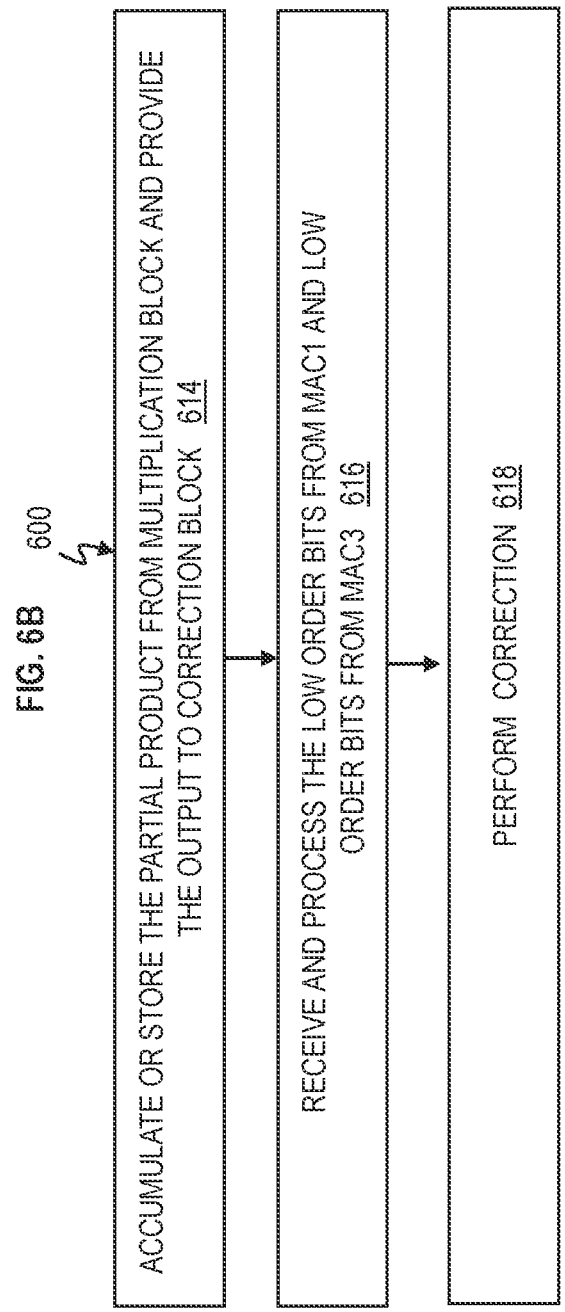

FIG. 7

TABLE 2: COMPLETION OF 256-BIT MULTIPLICATION OVER TIME

| Clock | 511 - 384 | 343 - 356 | 255 - 128 | 127 - 0 |
|-------|-----------|-----------|-----------|---------|
| 0 | NOT COMPLETE | NOT COMPLETE | NOT COMPLETE | FULLY COMPLETE |
| 1 | PARTIALLY COMPLETE | PARTIALLY COMPLETE | FULLY COMPLETE | FULLY COMPLETE |
| 2 | PARTIALLY COMPLETE | FULLY COMPLETE | FULLY COMPLETE | FULLY COMPLETE |
| 3 | FULLY COMPLETE | FULLY COMPLETE | FULLY COMPLETE | FULLY COMPLETE |
| 4 | | | | |

Legend:
- NOT COMPLETE
- PARTIALLY COMPLETE
- FULLY COMPLETE

Clock 3 → Output Dead Cycle
Clock 4 → Input Dead Cycle

FIG. 8

TABLE 3: 3-PART COMPLETION OF 384-BIT MULTIPLICATION

| Cycle | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| MAC1 out 1 | MAC1 out | MAC1 out | MAC1 out | | | MAC1 out | MAC1 out | MAC1 out | MAC1 out | | | MAC1 out | | MAC1 out | | | MAC1 out | | MAC1 out | MAC1 out | | | | | |
| MAC1 out 2 | | | MAC1 out | | | | | MAC1 out | MAC1 out | | | | | MAC1 out | | | MAC1 out | | MAC1 out | MAC1 out | | | | | |
| MAC2 out 3 | | | | | | | | | MAC2 out | MAC2 out | MAC2 out | MAC2 out | MAC2 out | MAC2 out | MAC2 out | MAC2 out | MAC2 out | | | MAC2 out | | MAC2 out | MAC2 out | | MAC2 out |
| MAC2 out 4 | | | | | | | | | | | | | | | | | MAC2 out | MAC2 out | | | | | | | | |
| MAC3 out 5 | | | | | | | | | | | | | | | | | | | | MAC3 out | | MAC3 out | MAC3 out | MAC3 out | MAC3 out | MAC3 out |
| MAC3 out 6 | | | | | | | | | | | | | | | | | | | | | | | | | | MAC3 out |

OUTPUT FROM MAC1 DISCARDED

FIRST VALID INPUT TO MAC2

DISCARDED

FIRST VALID INPUT TO MAC3

VALID OUTPUT FROM MAC1 TO MAC2; GOES INTO ACC STORAGE

VALID OUTPUTS FROM MAC3

DISCARDED

FIG. 9

TABLE 4: MODULAR ARITHMETIC PERFORMANCE SPECIFICATIONS (IN CLOCKS)

| PRIME WIDTH | BINARY ADD/SUB | | BINARY MUL | | MODULAR ADD/SUB | | MODULAR MUL | |
|---|---|---|---|---|---|---|---|---|
| | LATENCY | ITERATION INTERVAL (II) | LATENCY | ITERATION INTERVAL (II) | LATENCY | ITERATION INTERVAL (II) | LATENCY | ITERATION INTERVAL (II) |
| 64-BIT | 4 | 1 | 7 | 1 | 6 | 1 | 21 | 1 |
| 128-BIT | 4 | 1 | 7 | 1 | 6 | 1 | 21 | 1 |
| 256-BIT | 4 | 1 | 11 | 5 | 6 | 1 | 25 | 5 |
| 384-BIT | 5 | 2 | 16 | 10 | 7 | 2 | 30 | 10 |
| 512-BIT | 5 | 2 | 23 | 17 | 7 | 2 | 37 | 17 |
| 768-BIT | 6 | 3 | 43 | 37 | 8 | 3 | 57 | 37 |
| 1024-BIT | 7 | 4 | 71 | 65 | 9 | 4 | 85 | 65 |

PIPELINED HARDWARE TO ACCELERATE MODULAR ARITHMETIC OPERATIONS

BACKGROUND

The present invention generally relates to computer systems, and more specifically, to computer-implemented methods, computer systems, and computer program products configured and arranged for pipelined hardware to accelerate modular arithmetic operations including elliptic curve cryptography.

Elliptic curve cryptography is an approach to public-key cryptography that is based on the algebraic structure of elliptic curves over finite fields. Elliptic curve cryptography allows smaller keys than those used by non-elliptic curve cryptography, such as cryptography that is based on plain Galois fields, to provide equivalent security. In mathematics, a finite field or Galois field is a field that contains a finite number of elements. As with any field, a finite field is a set on which the operations of multiplication, addition, subtraction, and division are defined and satisfy certain basic rules. The most common examples of finite fields are given by the integers mod p when p is a prime number. Elliptic curves are applicable for key agreement, digital signatures, pseudo-random generators, and other tasks. Indirectly, they can be used for encryption by combining the key agreement with a symmetric encryption scheme. Elliptic curve cryptography uses modular arithmetic logic units.

In mathematics, modular arithmetic is a system of arithmetic for integers, where numbers "wrap around" when reaching a certain value, called the modulus. In computing, a modular arithmetic logic unit is a combinational digital circuit that performs field arithmetic (including addition, subtraction, and multiplication), which is computationally intensive. The hardware of modular arithmetic logic units that perform modular arithmetic is limited to a fixed size that only accommodates data have the same size. Improvements in the use of modular arithmetic logic units is needed. Particularly, improvements to the limited size of the data that can be accommodated by modular arithmetic logic units is needed.

SUMMARY

Embodiments of the present invention are directed to computer-implemented methods for pipelined hardware to accelerate modular arithmetic operations including, for example, elliptic curve cryptography scalar multiplications in a generic field with heavy pipelining between field operations. A non-limiting example computer-implemented method includes determining a bit width of operands in data to be processed by a modular hardware block and checking whether the bit width of the operands matches a fixed bit width of the modular hardware block. The method also includes in response to there being a match, causing the modular hardware block to process the operands and in response to there being a mismatch, modifying the operands to be accommodated by the fixed bit width of the modular hardware block and causing the modular hardware block to process the modified operands. One or more embodiments of the present invention are directed to a system for elliptic curve cryptography scalar multiplications in a generic field with heavy pipelining between field operations. A non-limiting example of the system includes a memory having computer-readable instructions and one or more processors for executing the computer-readable instructions. The computer-readable instructions may implement the above method. One or more embodiments of the present invention are directed to a computer-program product for elliptic curve cryptography scalar multiplications in a generic field with heavy pipelining between field operations, the computer-program product including a computer-readable storage medium having program instructions embodied therewith. The program instructions are executable by a processor to cause the processor to perform the above method.

This can provide an improvement over known methods for elliptic curve cryptography scalar multiplications by efficiently performing scalar multiplication on the same modular hardware block for different sets of data having operands with different bit widths. Each set of data can be efficiently modified for processing by the same modular hardware block having a fixed bit width, although the original sets of data have operands with bit widths that do not match the fixed bit width.

In addition to one or more of the features described above or below, or as an alternative, in further embodiments of the invention determining the bit width of the operands in the data to be processed by the modular hardware block includes parsing the operands to obtain the bit width.

In addition to one or more of the features described above or below, or as an alternative, in further embodiments of the invention checking whether the bit width of the operands matches the fixed bit width of the modular hardware block includes comparing the bit width of the operands to the fixed bit width of the modular hardware block. Thus, advantageously allowing data with operands of a different bit width to be recognized for further modification.

In addition to one or more of the features described above or below, or as an alternative, in further embodiments of the invention the modular hardware block includes a first multiplication accumulator, a second multiplication accumulator, and a third multiplication accumulator in series. One or more embodiments advantageously use (only) three multiplication accumulators to efficiently accommodate operands with different bit widths.

In addition to one or more of the features described above or below, or as an alternative, in further embodiments of the invention the modular hardware block includes a series of multiplication accumulators followed by a correction block.

In addition to one or more of the features described above or below, or as an alternative, in further embodiments of the invention modifying the operands to be accommodated by the fixed bit width of the modular hardware block includes: comparing the bit width of the operands to the fixed bit width of the modular hardware block; dividing the bit width of the operands into a size that is accommodated by the fixed bit width, responsive to the bit width being larger than the fixed bit width; and increasing the bit width of the operands to the size that is accommodated by the fixed bit width, responsive to the bit width being smaller than the fixed bit width. Thus, advantageously allowing operands with different bit widths to be accommodated by the same hardware.

In addition to one or more of the features described above or below, or as an alternative, in further embodiments of the invention the fixed bit width is a fixed size of a hardware structure that holds an individual operand for processing. Accordingly, the hardware structure holds both operands of the fixed bit width for processing.

Embodiments of the present invention are directed to a computer-implemented method of forming a modular hardware block for scalar multiplication. The method includes coupling a first multiplication accumulator, a second multiplication accumulator, and a third multiplication accumulator in series and coupling an input of a correction block to the third multiplication accumulator.

This is an improvement over known methods for elliptic curve cryptography scalar multiplications by efficiently performing scalar multiplication on the same modular hardware block for different sets of data having operands with different bit widths, using (only) three multiplication accumulators which each process the data.

In addition to one or more of the features described above or below, or as an alternative, in further embodiments of the invention each of the first, the second, and the third multiplication accumulators include a multiplication block coupled to an accumulator block, the multiplication block having a fixed bit width.

In addition to one or more of the features described above or below, or as an alternative, in further embodiments of the invention a data array is coupled to the first multiplication accumulator.

In addition to one or more of the features described above or below, or as an alternative, in further embodiments of the invention a module is coupled to the modular hardware block, the module configured to modify operands in data to accommodate a fixed bit width for the first multiplication accumulator. The module advantageously allows operands with different bit widths to be accommodated and processed by the same hardware.

Embodiments of the present invention are directed to a modular hardware block for scalar multiplication. The modular hardware block includes a first multiplication accumulator, a second multiplication accumulator, and a third multiplication accumulator coupled in series and each comprising a multiplication block coupled to an accumulator block, the multiplication block having a fixed bit width. The modular hardware block includes a correction block coupled to the third multiplication accumulator, a data array coupled to the first multiplication accumulator, and a module coupled to the data array, the module being configured to modify data to be accommodated by the fixed bit width.

This provides improvement over known methods for elliptic curve cryptography scalar multiplications by efficiently performing scalar multiplication on the same modular hardware block for different sets of data having operands with different bit widths. Each set of data can be efficiently modified for processing by the same modular hardware block having a fixed bit width.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts Table 1 illustrating operations for modular multiplication in accordance with one or more embodiments of the present invention;

FIG. 5 depicts a flowchart of a computer-implemented process for providing, scheduling, and/or executing elliptic curve cryptography scalar multiplications in a generic field with heavy pipelining between field operations in accordance with one or more embodiments of the present invention;

FIGS. 6A and 6B together depict a flowchart of a computer-implemented process for providing/executing elliptic curve cryptography scalar multiplications in a generic field with heavy pipelining between field operations in accordance with one or more embodiments of the present invention;

FIG. 7 depicts Table 2 illustrating the completion of 256-bit multiplication in accordance with one or more embodiments of the present invention;

FIG. 8 depicts Table 3 illustrating a 3-part completion of 384-bit multiplication in accordance with one or more embodiments of the present invention;

FIG. 9 depicts Table 4 illustrating example bit widths as prime widths that can be utilized in accordance with one or more embodiments of the present invention

DETAILED DESCRIPTION

One or more embodiments of the present invention provide computer-implemented methods, computer systems, and computer program products arranged and configured to perform modular multiplication on pipelined hardware, thereby allowing acceleration of elliptic curve cryptography scalar multiplications in a generic field with heavy pipelining between field operations.

Elliptic curve cryptography involves scalar multiplication performed in a finite field. The scalar multiplication operation involves point doubling and point addition. Each of these two point operations is achieved using underlying finite field arithmetic, namely addition, subtraction, multiplication, and inversion. One or more embodiments of the invention address the scheduling of the finite field operations, such as the addition (add) operation, subtraction (sub) operation, multiplication (mul) operation, etc., used in the point double operation and point add operation, thereby making the processing of the finite field operations faster and more efficient.

Elliptic curve cryptography operations are performed in a field, for example fields of integers modulo of the prime $2^{521}-1$. A scalar multiplication operation is the basic operation in elliptic curve cryptography. Scalar multiplication takes a point on a curve, and by repeated addition, yields another point which is 'k' times the first point. Scalar multiplication performs a series of point add and point double operations. As noted herein, field arithmetic including addition, subtraction, and multiplication is computationally intensive. One or more embodiments of the invention are configured to provide acceleration by optimizing the field arithmetic logic unit and by using pipelined (optimally) scheduled field operations. Using a modular arithmetic logic unit, one or more embodiments generate the optimal schedule of operations which completes an elliptic curve cryptography scalar multiplication in the least amount of time. References to a prime number being used in a modular operation can be interpreted as the underlying modulus of a modular operation. The modular arithmetic is not meant to be restricted to a prime number, although a prime number may be illustrated for explanatory purposes and not limitation in one or more embodiments. Rather, the hardware design can perform modular operations with any generic underlying modulus according to one or more embodiments of the invention. Typically, most applications have this modulus as a prime number.

Figure 1:
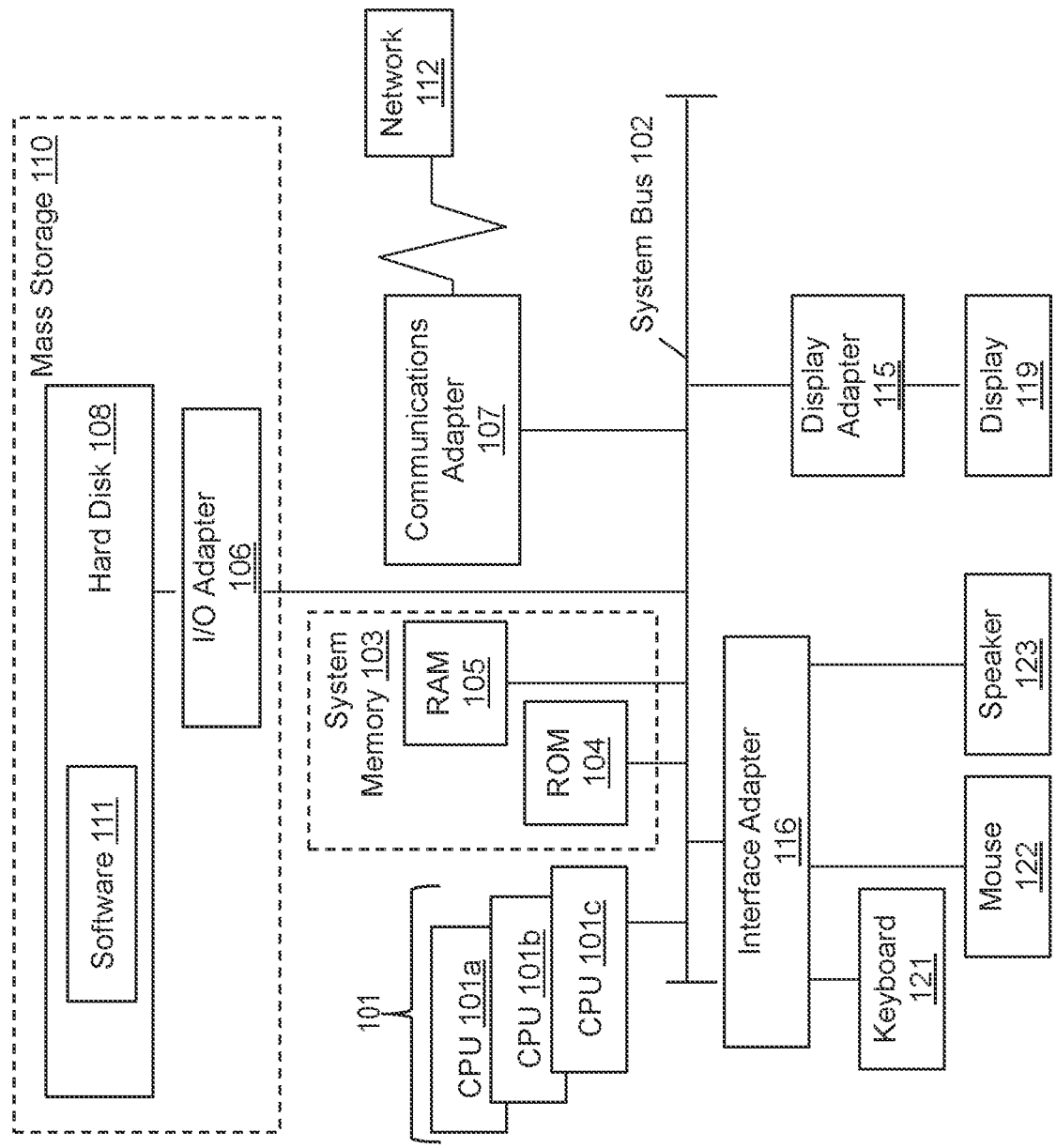
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
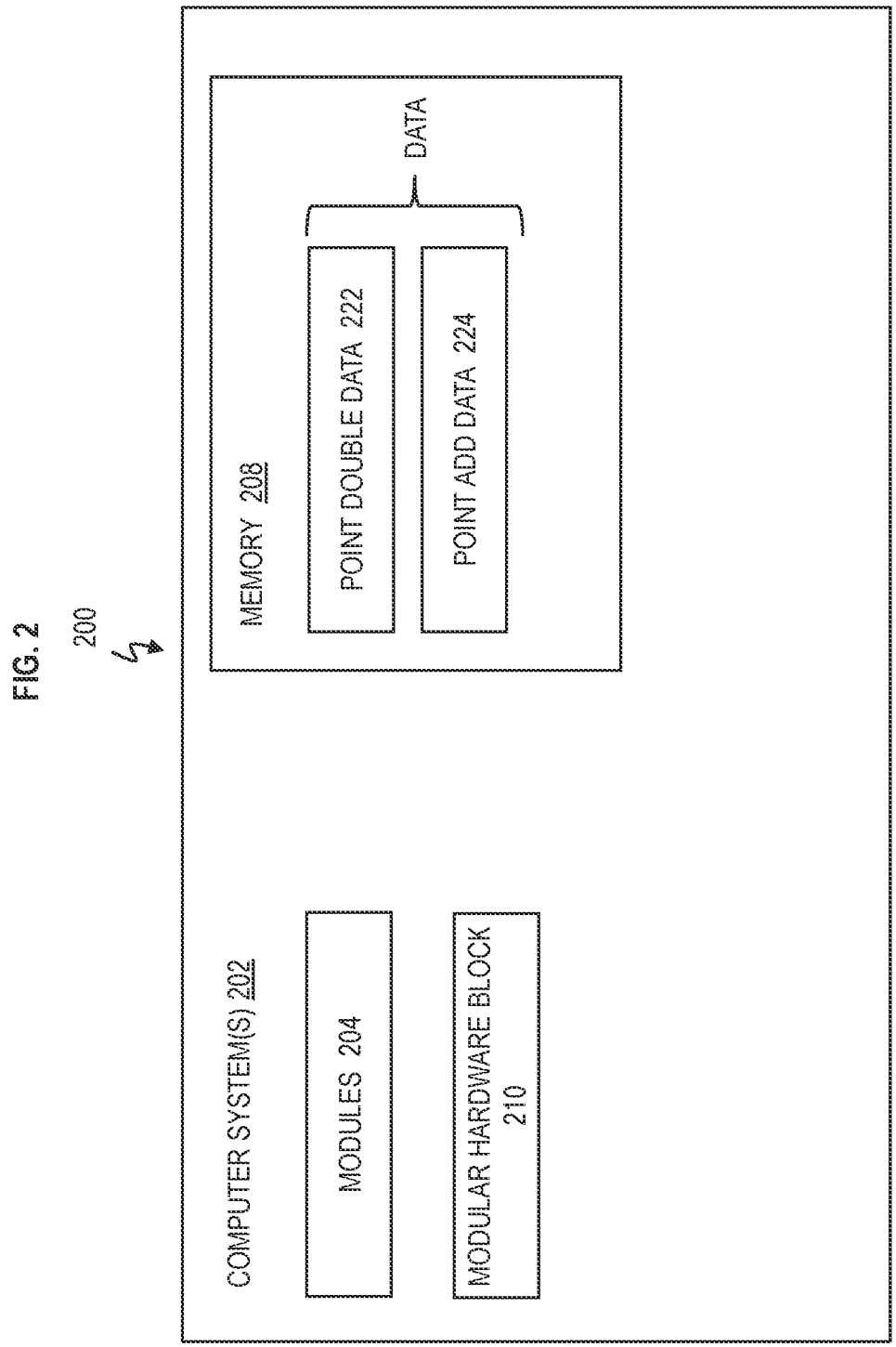
FIG. 2 depicts a block diagram of a system for providing, scheduling, and/or executing elliptic curve cryptography scalar multiplications in a generic field with heavy pipelining between field operations in accordance with one or more embodiments of the present invention.

FIG. 2 is a block diagram of a system 200 for providing, scheduling, and/or executing elliptic curve cryptography scalar multiplications in a generic field with heavy pipelining between field operations, thereby resulting in pipelined hardware acceleration of modular multiplication in accordance with one or more embodiments of the present invention. System 200 includes one or more computer systems 202. Computer system 202 can include any elements and functions of computer system 100 discussed in FIG. 1. Computer system 202 can include one or more modules 204 which are configured to perform the scheduling of the finite field operations, such as the addition (add) operation, subtraction (sub) operation, multiplication (mul) operation, etc., used in the point double operation and point add operation, as well as cause the operation of modular hardware blocks. Module 204 implements and/or executes one or more algorithms (e.g., depicted in FIGS. 3A and 3B) that cause point double and point add to be performed on a single arithmetic unit by scheduling the field multiply and field addition/subtraction operations to achieve a minimum execution time. In one or more embodiments, module 204 implements and/or executes one or more algorithms that cause point double and point add to be performed on a modular hardware block 210 that performs modular multiplication to achieve a minimum execution time and which can apply to data originally having operands with different bit widths.

Figure 3:
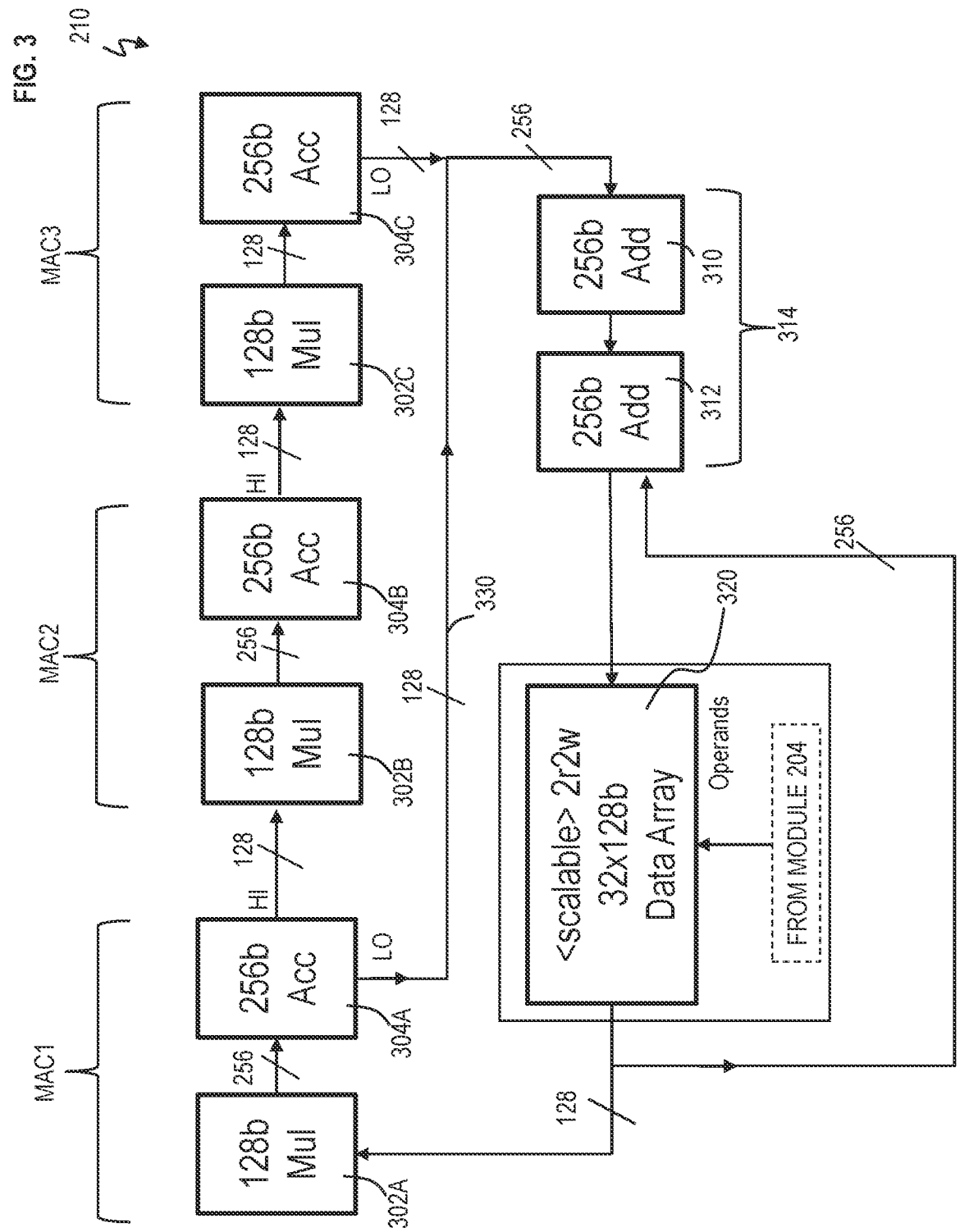
FIG. 3 depicts a block diagram of an example modular hardware block in accordance with one or more embodiments of the present invention.

FIG. 3 is a block diagram of an example modular hardware block 210 in accordance with one or more embodiments of the invention. Modular hardware block 210 has three multiplication blocks 302A, 302B, 302C, generally referred to as multiplication blocks 302, each having its own accumulator block 304A, 304B, 304C, generally referred to as accumulator blocks 304. Each multiplication block 302 together with its accumulator block 304 forms a multiplication-accumulator (MAC), also referred to as a multiply-and-accumulate unit, multiplication accumulator, etc. Each multiplication block 302 may be referred to as a multiplier, and each accumulator block may be referred to as an accumulator. In FIG. 3, there are three groups of a multiplication block 302 and an accumulator block 304 in series, which are designated as MAC1, MAC2, and MAC3. Each multiplication block 302 is structured to receive and process 128 bit (b) blocks or chunks of data, also referred to 128*b* width (e.g., 128 bit width). Each multiplication block 302 is a structure with a fixed bit width (e.g., 128 bits). The output of the last multiplication block 302C and its accumulator block 304C is fed to correction block 314. Correction block 314 includes two addition/subtraction blocks 310 and 312 in series. Addition/subtractions blocks 310 and 312 can perform addition operations and subtraction operations.

Data array 320 includes the data, which may be referred to as operands and/or operand data, on which the operations are to occur. The output of data array 320 is to the first multiplication block 302A for processing. Module 204 is configured to control the output of data from data array 320 to multiplication block 302A. Module 204 can have instructions and/or logic circuitry for operating data array 320. In one or more embodiments, module 204 may include a code array and/or the data array 320. In one or more embodiments, module 204 may be part of modular hardware block 210. In one or more embodiments, module 204 may be implemented on the same integrated circuit as modular hardware block 210.

Multiplication blocks 302A, 302B, 302C, accumulator blocks 304A, 304B, 304C, and addition/subtraction blocks 310 and 312 are formed of combinational logic, along with memory storage such as latches, registers, etc., to perform and function as discussed herein. Multiplication blocks 302A, 302B, 302C and addition/subtraction blocks 310 and 312 include combinational digital circuits that perform arithmetic and bitwise operations on integer binary numbers. In one or more embodiments, modular hardware block 210 may be logic circuitry and memory storage formed on a processor. Accumulator blocks 304A, 304B, 304C can be registers for short-term, intermediate storage of arithmetic and logic data in a computer's CPU (central processing unit). The numerical value in the accumulator increases as each number is added.

Modules 204 described in FIG. 2 can be implemented as instructions stored on a computer-readable storage medium, as hardware modules, as special-purpose hardware (e.g., application specific hardware, application specific integrated circuits (ASICs), as embedded controllers, hardwired circuitry, etc.), and/or as some combination or combinations of these. In examples, modules described herein can be a combination of hardware and programming. The programming can be processor executable instructions stored on a tangible memory, and the hardware can include processing circuitry (e.g., processors 101) for executing those instructions. Thus, a system memory can store program instructions that when executed by processing circuitry implement the modules described herein. For example, the executable instructions can be implemented as software 111 executed on one or more processors 101, as discussed in FIG. 1. Elements of computer system 100 can be used in and/or integrated into computer system 202 in accordance with one or more embodiments of the invention. Other modules can also be utilized to include other features and functionality described in other examples herein. Alternatively or additionally, modules can include dedicated hardware, such as one or more integrated circuits, application specific integrated circuits (ASICs), application specific special processors (ASSPs), field programmable gate arrays (FPGAs), or any combination of the foregoing examples of dedicated hardware, for performing the techniques described herein.

As would be recognized by one skilled in the art, modular hardware block 210 is configured to perform modular multiplication using Barrett or Montgomery multiplication. Both Barrett and Montgomery algorithms require a pre-computation, have 3 multiplication stages, 1 subtraction stage, and 1 conditional correction stage. An example of the Barrett algorithm which is implemented by modular hardware block 210 is illustrated in the Table 1 shown in FIG. 4. In FIG. 4, Table 1 illustrates six operations for modular multiplication. Operation 1 is performed by data array 320 and module 204. In one or more embodiments, operation 1 may be predetermined and/or determined in advance. Operation 2 is performed by MAC1, operation 3 is performed by MAC2, and operation 4 is performed by MAC3. Operation 5 is performed by addition/subtraction block 310. Operation 6 is performed by addition/subtraction block 312. In FIG. 4, "k" is the bit width, "a" and "b" are operands, "p" is the modulus, usually a prime number (which is a known constant), "μ" is a precomputed constant dependent only on the modulus "p" and can loosely be interpreted as an approximation of the inverse of the modulus "p", "res" is the binary multiplication of "a" and "b", "r2" is an intermediate binary multiplication result of higher order bits of "q2" with the prime modulus "p", "q2" is an intermediate binary multiplication result of the higher order bits of "res" with "µ", and "r" is the final result of the modular multiplication "a times b mod p". In FIG. 4, "lo" (low or low order bits) is k-bit wide starting from the least significant bit (LSB), and "hi" (high or high order bits) is k-bit wide starting from the most significant bit (MSB).

FIG. 5 is a flowchart of a computer-implemented process 500 for providing, scheduling, and/or executing elliptic curve cryptography scalar multiplications in a generic field with heavy pipelining between field operations, thereby resulting in pipeline hardware acceleration of modular multiplication by modular hardware block 210 in accordance with one or more embodiments of the present invention. The computer-implemented process 500 in FIG. 5 can be implemented using system 200 shown in FIG. 2. Accordingly, the computer-implemented process 500 will now be described with reference to system 200.

At block 502, module 204 of computer system 202 is configured to receive data having operands, for example, point double data 222 and point add data 224 which may be stored in memory 208. At block 504, module 204 is configured to determine a bit width or bit width size of operands in the data and/or prime width (size) of operands for data requiring modular multiplication operation by modular hardware block 210. Module 204 is configured to parse the data to determine the bit width of the operands that are to be processed by modular hardware block 210. Module 204 may read the operands to determine the bit width. In one or more embodiments, the bit width of the operands may be determined in advance.

At block 506, module 204 is configured to check if the bit width size and/or prime width size of operands for the data, both of which can be called bit width, matches the fixed bit width (size)/structure of the first multiplication block 302A. For example, the multiplication blocks 302 (including the first multiplication block 302A) have a fixed bit width size and/or fixed structure to accommodate operands having the same bit width. For example, multiplication blocks 302 are illustrated with a fixed bit width of 128 bits for explanation purposes. Accordingly, each operand (e.g., operand "a" and "b") that is input to first multiplication block 302A as well as second and third multiplication blocks 302B and 302C is to have a bit width that matches the fixed bit width (e.g., 128 bits). If there is a match is bit width, flow proceeds to block 512.

Otherwise, when the bit width of the operands in the data does not match the fixed bit width (e.g., 128 bit) of multiplication blocks 302 of modular hardware block 210, module 204 is configured to determine how to modify the size of the bit width of the operands (e.g., bit width size and/or prime width size) to a size that is accommodated/contained by the fixed bit width of multiplication blocks 302 at block 508. The operands of data can have various bit widths, as illustrated in Table 4 in FIG. 9. One set of data can have operands with a certain bit width for modular hardware block 210 to process. Another set of data can have operands with a different bit width for processing by modular hardware block 210. As depicted in FIG. 9, the bit width for the operands (e.g., operands "a" and "b") can be, for example, a 64 bit width, 128 bit width, 256 bit width, 384 bit width, 512 bit width, 768 bit width, 1024 bit width, etc. Module 204 is configured to modify operands having a greater bit width than the fixed bit width of multiplication blocks 302 and operands having a smaller bit width than the fixed bit width of multiplication blocks 302. When the bit width of the operands is smaller than the fixed bit width of multiplication blocks 302, module 204 is configured to pad the operands with zeros (0's) for the beginning or least significant bits. For example, if the operand is 64 bits, module 204 is configured to pad each operand with zeros until 128 bits is reached before sending the operands to the first multiplication block 302A for processing. On the other hand, when the bit width of the operands is greater than the fixed bit width of multiplication blocks 302, module 204 is configured to determine if the bit width of the operands is an exact multiple (i.e., no remainder) of the fixed bit width, and if so, module 204 is configured to divide the size of the bit width of the operands by the size of the fixed bit width in order to determine the equal parts or factor (i.e., the quotient) for each operand; according module 204 send the equal parts and/or factors to modular hardware block 210 for processing. For example, if each operand has a 512 bit width and the fixed bit width of first multiplication block 302A is 128 bits, then module 204 determines that the quotient is exactly 4 and is configured to send to first multiplication block 302A 4 blocks/chunks of data for each operand at 128 bits each. When the bit width of the operands is not an exact multiple (i.e., has a remainder) of the fixed bit width, module 204 is configured to divide the operand into blocks/chunks of data and pad the last block/chunk with zeros (0's) for the beginning and/or least significant bits.

At block 510, module 204 is configured to modify the size of the bit width and/or prime width of operands into blocks/chunks of a size (e.g., 128 bit width) that are accommodated by (e.g., match) the fixed bit width/structure of the first multiplication block 302A (as well as the second and third multiplication blocks 302B and 302C). At block 512, module 204 is configured to input and/or cause to be input to first multiplication block 302A the operands of the data in the blocks/chunks which match the fixed bit width/structure of first multiplication block 302A, thereby initiating and/or causing operation of modular hardware block 210 even when the bit width of the operands for the data does not (originally) match the fixed bit width/structure of multiplication blocks 302. Module 204 inputs the blocks/chunks in correct bit width for each operand (e.g., operands "a" and "b") even if the original bit width of the operands was different in the data.

Figure 6A:
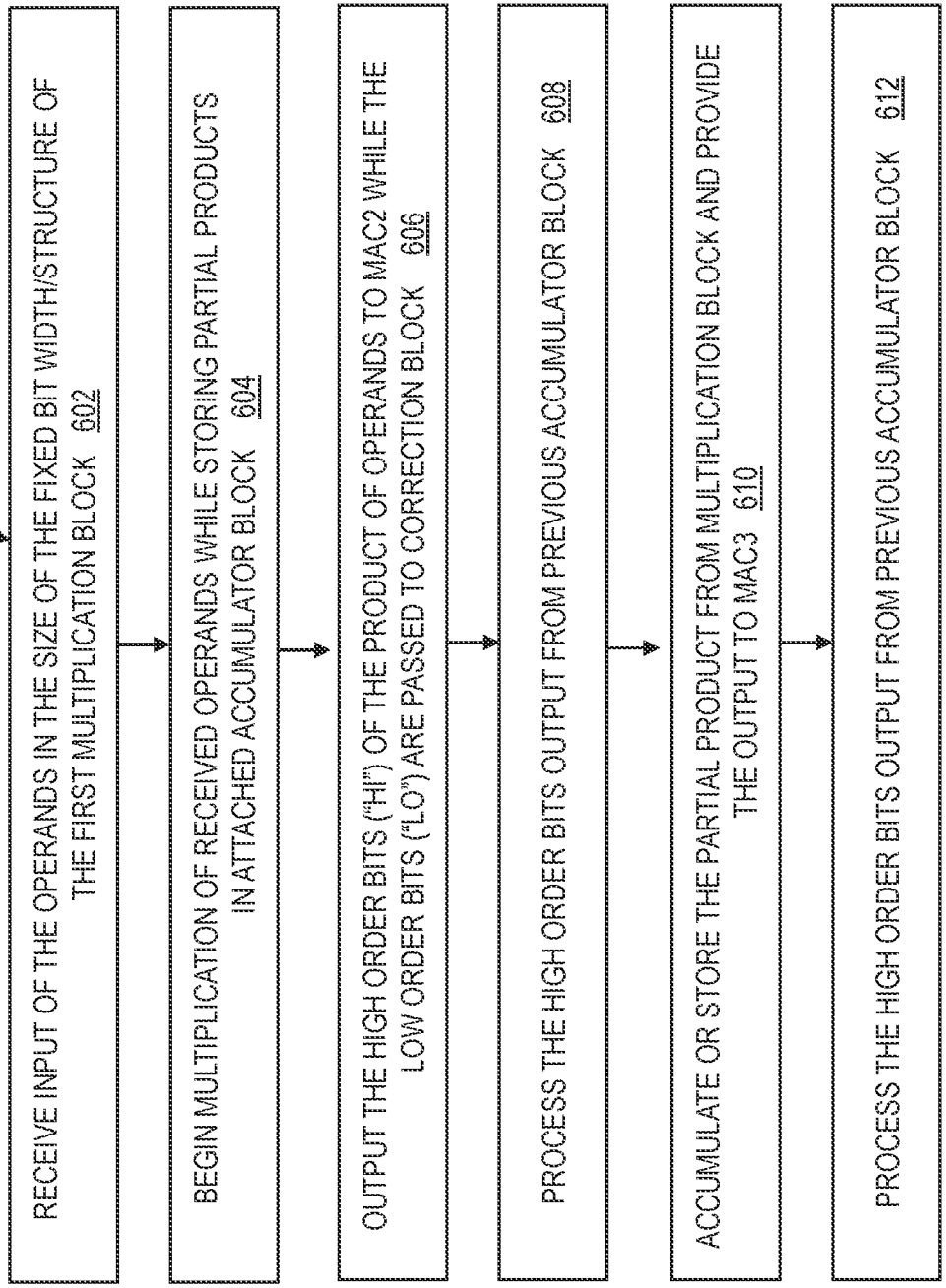

FIGS. 6A and 6B together depict a flowchart of a computer-implemented process 600 for providing/executing elliptic curve cryptography scalar multiplications in a generic field with heavy pipelining between field operations, thereby resulting in pipeline hardware acceleration of modular multiplication by modular hardware block 210 in accordance with one or more embodiments of the present invention. The computer-implemented process 600 in FIGS. 6A and 6B can be implemented using system 200 shown in FIG. 2 and modular hardware block 210. Accordingly, the computer-implemented process 600 will now be described with reference to system 200 and modular hardware block 210. During initialization, MAC2 particularly multiplication block 302B receives and stores the value of "µ" as one of the operands, where "µ" is a precomputed constant dependent only on the modulus "p" as discussed herein. Similarly, during initialization MAC3 particularly multiplication block 302C receives and stores the value of "p" as one of the operands, wherein "p" is the prime. The values of "µ" and "p" are constants that are utilized for a number of operations and are initialized and stored in MAC2 and MAC3, respectively. The values of "µ" and "p" may be fed from module 204 (e.g., via data array 320) during initialization. A new prime modulus means that these two (values of "µ" and "p") are to be refreshed before the modular multiplication operation starts.

For computer-implemented process 600, at block 602, modular hardware block 210 is configured to receive input of the operands (e.g., operands "a" and "b") in the size of the fixed bit width/structure of the first multiplication block 302A. For example, modular hardware block 210 can receive the blocks/chunks of operands of data, which module 204 has input and/or caused to be input to first multiplication block 302A (as discussed in FIG. 5). In one or more embodiments, module 204 may instruct and/or cause data array 320 to output blocks/chunks of operands (data) to first multiplication block 302A.

At block 604, multiplication block 302A of modular hardware block 210 is configured to begin multiplication of received operands, for example, operands "a" and "b" while storing partial products in its attached accumulator block 304A. In some cases, an operand can be 128 bits, and multiplication block 302A can multiply the two operands (e.g., 128 bit operand "a" and 128 bit operand "b") and pass the result to its accumulator block 304A. In some cases, the operand may be larger than the fixed bit width of multiplication block 302A, and multiplication block 302A will receive blocks/chunks of bits for the operands each with, for example, a 128 bit width (after modification by module 204). Accordingly, multiplication block 302A is configured to multiply the first 128 bits of the two operands together, for example, multiply the first 128 bit block/chunk of operand "a" times the first 128 bit block/chunk of operand "b", and then pass a 256 bit width partial product to accumulator block 304A. Accumulator block 304A stores the first partial product, while multiplication block 302A prepares the second partial product. Upon receiving the second partial product from multiplication block 302A, accumulator block 304A is configured to store the second partial product and add it to the first partial product if necessary. This process continues until the last block/chunk of operands "a" and "b" is processed by multiplication block 302A and subsequently processed by accumulator block 304A. The result (res) of multiplication block 302A and its accumulator block 304A is 256 bits wide and is the complete product. In other words, MAC1, which is multiplication block 302A and accumulator block 304A, outputs the result (res) of operands a*b which corresponds to performing operation 2 (res=a*b) in FIG. 4, and this output (in part) is passed onto MAC2. Particularly, at block 606, accumulator block 304A of modular hardware block 210 is configured to output the high order bits ("hi") of the product of operands to MAC2 while the low order bits ("10") are passed to correction block 314. Further, regarding the processing by accumulator block 304 is discussed later herein in FIG. 7.

At block 608, multiplication block 302B of modular hardware block 210 is configured to process the result (res(1+hi)) from MAC1, particularly, the high order bits output from accumulator block 304A. MAC1 transfers only the higher order bits res(1+hi) to MAC2 which then computes operation 3. At block 610, the accumulator block 304B is configured to accumulate or store the partial product from multiplication block 302B and provide the output to MAC3. MAC2, which is multiplication block 302B and accumulator block 304B, is configured to perform operation 3 in FIG. 4 which is q2=res(1+hi)*µ and to provide this output (q2) to MAC3. Recall that res(1+hi) was provided by MAC1 and "µ" was received during initialization. Accordingly, multiplication block multiplies the operand "res(1+hi)" times the operand "µ" while the partial product accumulates in accumulator block 304B until the complete product is finished. It should be appreciated that "res(1+hi)" is a representation that denotes the value of the higher order bits of "res" from MAC1. The "(1+hi)" notation is an indexing notation referring to selecting the higher order bits of "res", where "hi" is defined as consisting of half the bits of the number which are the higher order half. For "res", this is the "k" higher order bits. So, "1+hi" picks out the higher order "k+1" bits of "res". MAC2 hardware is the same as MAC1 and performs the multiplication of two numbers. Similarly, MAC2 feeds only the higher order bits q2(1+hi) of the complete product into MAC3.

At block 612, multiplication block 302C of modular hardware block 210 is configured to process the output (e.g., q2(1+hi)) from MAC2, particularly, the high order bits output from accumulator block 304B. MAC2 feeds only the higher order bits q2(1+hi) into MAC3 which multiplies that with "p" which MAC2 has stored locally after initialization. At block 614, the accumulator block 304C is configured to accumulate or store the partial product from multiplication block 302B and provide the output to correction block 314. Particularly, MAC3 is configured to perform operation 4 in FIG. 4 which is r2=q2(1+hi)*p and provide this output to correction block 314. MAC3 hardware is the same as MAC3 and performs the multiplication of two numbers. However, unlike MAC1 and MAC2, MAC3 feeds only the low order bits r2(lo+1) into correction block 314. MAC1, MAC2, and MAC3 are the same hardware. Each accumulator generates the output of the multiplication starting from the lower order bits. MAC3 outputs the lower order bits as valid bits. MAC1 and MAC2 also output the lower order bits, but do not mark them as valid. Only once the higher order bits are generated, a valid signal is asserted so that the subsequent block (MAC2 or MAC3) knows that it should start processing. So, the higher or lower bits are passed on via control logic and signaling. MAC1, MAC2, and MAC3 each have control logic and signaling capabilities to perform as discussed herein.

At block 616, correction block 314 of modular hardware block 210 is configured to receive and process the low order bits ("res(lo+1)") from MAC1 (particularly from accumulator block 304A) and low order bits from MAC3 (particularly from accumulator block 304C). This allows correction block 314 to perform operation 5 of FIG. 4, which is r=res(lo+1)−r2(lo+1) for a modular check. In particular, addition/subtraction block 310, which performs addition and subtraction, is configured to perform the subtraction of "r2(lo+1)" from "res(lo+1)", thereby performing operation 5 which returns the answer "r". The output of addition/subtraction block 310 is fed to addition/subtraction block 312. At block 618, addition/subtraction block 312 of correction block 314 is configured to perform correction using r—add $2^{(k+1)}$, subtract "p", or subtract 2p using feedback and output from addition/subtraction block 310. Adding $2^{(k+1)}$ is discarding the $(k+1)^{th}$ bit and using only the lower order k-bits. So, it always does two things, which are to keep the result from the block 310 as is (call this "m") and store an additional value by subtracting "p" from the result of block 310 (call this "n"). Chunks are processed 256 bits at a time here, so for numbers>256 bits, this would happen over multiple cycles. The output of block 310 is (k+1) bits of the result and an additional bit indicating a borrow in the subtraction, i.e., the $(k+2)^{th}$ bit. After all the chunks from block 310 are processed, the $(k+1)^{th}$ bit and the $(k+2)^{th}$ bit are checked in "m". If both are 1 or both are 0, then the add $2^{(k+1)}$ condition needs to be executed and that is done by sending out the first "k" bits of "m". Else, if $(k+2)^{th}$ bit is 0 but the $(k+1)^{th}$ bit is 1, addition/subtraction block 312 looks at the $(k+1)^{th}$ bit of "n". If that is 0 then "k" bits of "n" are output as the result. Else, if that is 1, then "p" is subtracted from "n" and "k" bits of the result of that operation are output. Further, an alternate implementation could be to store an additional value "o" by subtracting "2p" from the result of block 310 and then choosing "m", "n", or "o" depending on the conditions described above. It is noted that addition/subtraction block 312 was initialized with "p", which may have been fed by module 204 during initialization.

As introduced above, FIG. 7 illustrates Table 2 depicting the completion of 256-bit multiplication over time in accordance with one or more embodiments of the invention. Table 2 shows the different phases of performing a 256-bit multiplication on a 128-bit multiplier (e.g., multiplication blocks 302A, 302B, 302C are depicted as 128-bit multipliers) according to one or more embodiments. Although 256-bit multiplication is illustrated as an example explanatory purposes, embodiments of the invention are not meant to be limited. The input 256-bit operands "a" and "b are split into 2 128-bit block/chunks each, say (a0, a1) and (b0, b1), for example, using module 204. Table 2 applies to each respective multiplication block 302 and its associated accumulator block 304, thereby forming a single MAC. Multiplication block 302 proceeds to compute partial products of these blocks/chunks and then accumulates them in accumulator block 304 to give the full product of 512 bits. In the first clock (e.g., clock cycle 0), the MAC computes a0 times b0 giving 256 bits. Of these 256 bits, the lower 128 bits are valid bits in the final product and are marked green which is represented by the pattern of diagonal lines in Table 2. These 128-bits are output from the accumulator block 304. The upper 128 bits (e.g., in 255:128) are incomplete and need accumulation of other partial products and are marked yellow which is represented by the pattern of dashed vertical lines in Table 2. These upper 128 bits are held in the accumulator block 304. In the next clock (e.g., clock cycle 1), multiplication block 302 is configured to compute the product of a0 times b1 given the incomplete bits 383:128. These are accumulated with the previously stored bits 255:128. However, that still does not complete enough to output; as such, all 256 bits 383:128 are held in the accumulator block 304 as partially complete and there is no valid output.

Continuing FIG. 7, in the next clock (e.g., clock cycle 2), multiplication block 302 compute a1 times b0 given the incomplete bits 383:128 from the previous clock. This time, MAC is configured to accumulate all the previous collections of bits 255:128 in accumulation block 304 and that portion is now fully complete and marked green (represented by diagonal lines). For the last computation in the next clock (e.g., clock cycle 3), the MAC has a1 times b1 given bits 511:256. Once again, due to all the accumulations in accumulation block 304 from the previous cycles together with the bits 511:256, the MAC has the full 512-bit product computed. So, in this clock (e.g., clock cycle 3), the MAC got 256 valid bits out from the accumulator block 304. However, since the bus width is only 128-bit out from the accumulator, the MAC has to send the 256-bits over two clocks giving one additional clock (e.g. clock cycle 4) just for data transfer. Accordingly, for a 256-bit modular multiplication with operations 2, 3, 4 being performed in MACs 1, 2, 3 respectively, each MAC would perform exactly the same 256-bit binary multiplication as shown in Table 2. The only difference is the input bits being fed to the different MACs. MAC1 would receive the operands a and b. MAC2 would receive the higher order of the 256 bits from MAC1, and MAC3 would receive the higher order of the 256 bits from MAC2, but MAC3 will output the lower order of the 256 bits to the correction block. In FIG. 7, it is noted that clock number 1 is an "Output Dead Cycle" because no new valid bits are completed. Similarly, clock number 4 is an "Input Dead Cycle" because no new input bits need to be computed, i.e., the MAC has completed.

FIG. 8 illustrates Table 3 depicting a 3-part completion of 384-bit multiplication in accordance with one or more embodiments of the invention. Table 3 shows the overall modular multiplication operation in MAC 1, 2, 3 for a bit width of 384 bits. The operation starts on MAC1 in the clock cycle 0 in the column labelled 0 and goes on through clock cycle 9 which is the column labelled 9. The clock cycle 10 is a dead output cycle similar to what is shown for 256-bit case in FIG. 7 because MAC1 is configured to generate 256 valid bits out from the accumulator in clock cycle 9 and that gets output over 2 clocks 9 and 10 over a 128-bit bus. A 384-bit multiplication requires inputs operands to be divided into 3 128-bit blocks/chunks each and the computation of 6 128-bit output product chunks to give a 784-bit result. The 6 output block/chunks are delivered after the accumulation in cycles marked MAC1 out illustrated in clock cycles 1, 3, 6, 8, 9. That completes one multiplication for MAC1 marked in grey which is depicted by a dot pattern in rows 1 and 2 in Table 3. Once MAC1 has generated its outputs, MAC1 can start working on the next multiplication shown in red which is depicted by a line pattern in rows 1 and 2. This is an exact copy of the columns 0 to 9, for different operands.

MAC2 then picks up the higher order bits only from MAC1. For the 384-bit case, the 3 higher order blocks/chunks out of the total 6 output chunks are needed. So, MAC2 discards the first 3 outputs from MAC1 and uses the last 3 outputs to perform exactly the same operation as MAC1 over the course of columns 9 to 17 which are clock cycles 9 to 17. Similarly, MAC3 then picks up only the last 3 outputs from MAC2 and repeats the same operation over columns 17 to 25 which are clock cycles 17 to 25. The overlap of the grey (dot patterns) and red (line patterns) operations shows the pipelining where the three different MACs could be operating on different data.

FIG. 9 illustrates Table 4 showing example bit widths as prime widths that can be utilized by system 200 in accordance with one or more embodiments of the invention. Modular hardware block 210, using its fixed bit width size for multiplication blocks 302, accumulator blocks 304, and addition/subtraction blocks 310 and 312, is configured process operands have the various bit widths. Latency denotes the number of clock cycles required to process operands, for example, operands "a" and "b" of a particular bit width. Iteration interval refers to the latency for the next operation after completing of a multiplication product, such as, the number of clock cycles required after MAC1 completes its entire multiplication product before starting the next multiplication product for MAC1. As discussed herein, one or more embodiments provide a modular arithmetic logic unit arranged and configured to efficiently perform modular arithmetic on 128-bit blocks/chunks of data. Such a multiplier has a latency of four clock cycles for 256×256 multiplication as seen in FIG. 9 and described in FIG. 7. The architecture is a heavily pipelined system that allows multiple operations to run. The optimal schedule of operations is determined in order to exploit the pipelining available to the fullest, considering data dependencies. The method supports any underlying prime or prime width as seen in FIG. 9. One or more embodiments provide a performance improvement for various curves including National Institute of Standards and Technology (NIST) curves, Brainpool Standard Curves, etc. Also, the performance improvement applies to curves in the Weierstrass, Montgomery, Koeblitz, and Edwards families.

Figure 10:
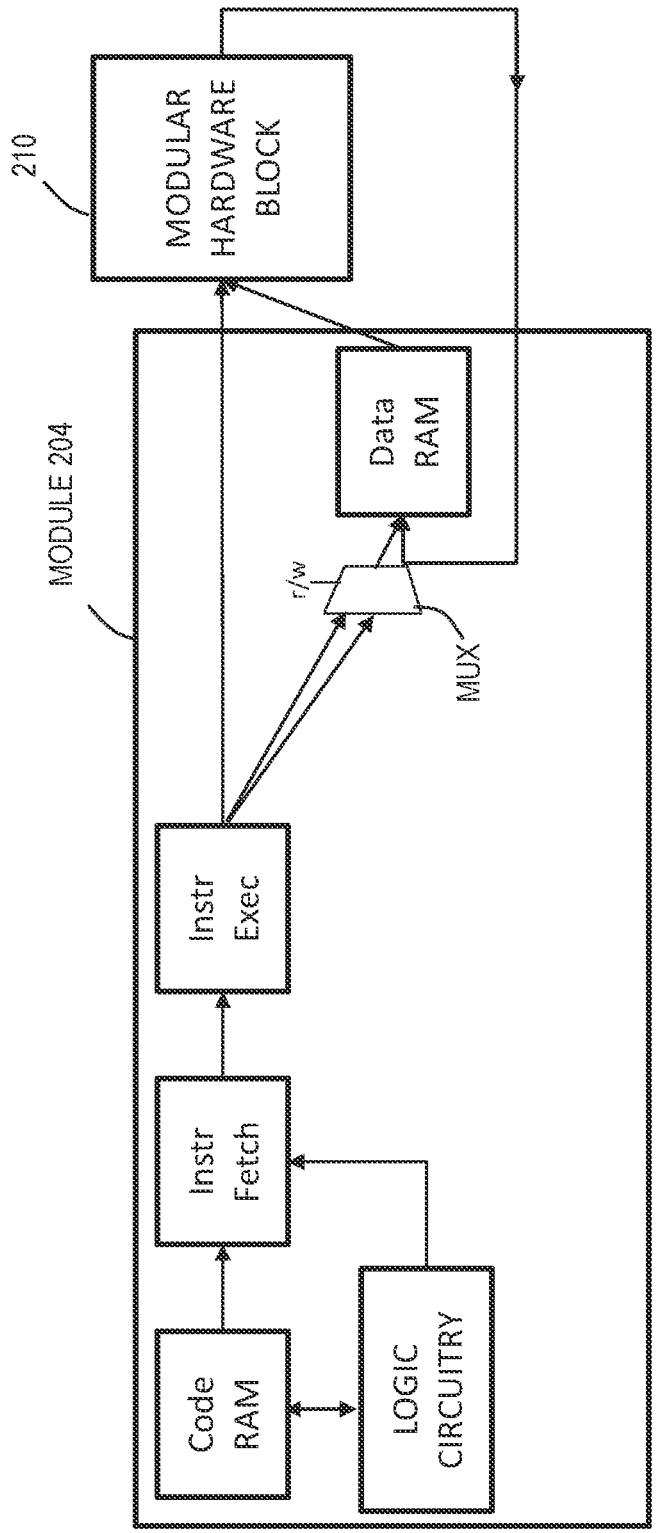
FIG. 10 depicts a block diagram of an example module in accordance with one or more embodiments of the present invention.

FIG. 10 is a block diagram of an example module 204 in accordance with one or more embodiments of the invention. Logic circuitry is used to schedule operations (e.g., point double data 222 and/or point add data 224) to cause modular multiplication to be performed on modular hardware block 210 for operands of various bit widths. Logic circuitry can arrange the data operations in code RAM at specific memory locations (memory addresses) and/or store the data operations after scheduling in code RAM. Examples of scheduling and/or modifying operands of data to accommodate a fixed bit width for processing is discussed in FIG. 5. The operands are instructions for execution. Instruction fetch block is configured to fetch the next instruction (i.e., operation(s)) from the memory address that is currently stored in the code RAM. The instructions correspond to operations. The instructions can be arranged for automatic selection by the instruction fetch block according to the execution schedule, for example, according to an arranged block of memory addresses. Also, logic circuitry can direct the order in which the instruction fetch block is to fetch the appropriate instruction (i.e., operation(s)). An instruction execution block may interpret the instruction if needed, and this interpretation/decoding can be performed by a decoder (not shown). The instruction execution block is configured to pass instruction (e.g., operations), which may be decoded information as a sequence of control signals, to the field ALU to perform the actions required by the instruction, such as to perform mathematical or logic functions on them, and the result can be written back to a data RAM. A multiplexer can also receive the instruction (operations) from the instruction execution block. The instruction execution block sends four addresses to the data RAM. Two of those addresses are meant for the read operation which are the addresses of the two operands to be read out and fed to the arithmetic unit (i.e., modular hardware block 210). The third address is intended for a write operation which is the address to write the result from the arithmetic unit (i.e., modular hardware block 210). The fourth address is used only during initialization of the data RAM. Based on the three conditions which are read/write/initialization, the multiplexer (mux) chooses the addresses that needs to be fed to the data RAM. It should be appreciated that although an example module 204 is depicted in a particular configuration, module 204 is not limited to the exact configuration shown in FIG. 10. Module 204 may have more or fewer components.

Technical benefits and advantages provide elliptic curve cryptography scalar multiplications in a generic field with heavy pipelining between field operations, thereby resulting in pipelines hardware acceleration of modular multiplication. One or more embodiments perform modular multiplication using the Barrett or Montgomery multiplication algorithm on pipelined hardware with (only) 3 MAC units. The operands are divided into blocks/chunks with each block/chunk the same size as the bit width that the multiplier supports. The number of partial products that need to be calculated is the square of the number of blocks/chunks. The blocks/chunks are fed into each MAC unit in an order that attempts to formulate the lower order bits of the output products first, and the higher order bits of the output products later. Each MAC (only) accepts blocks/chunks which are required to be processed because the other bits are discarded. Further, the final correction operation is (always) performed and then one of the two outputs is chosen. More particularly, technical solutions and benefits provide a modular hardware block that includes 3 cascaded MACs, where the MAC units which are followed by adder blocks (to perform correction operation in modular multiplication). The second MAC unit only accepts the higher-order product output from the first MAC unit and where the third MAC unit only accepts the higher-order product output from the second MAC unit. The first MAC quickly and efficiently accepts new modular multiplication operands no more than 1 clock after all the partial products of the previous modular multiplication operation are complete.

Technical benefits and advantages include mapping the scalar multiplication algorithm to 3 cascaded 128 by 128-bit multipliers that apply to operands of varying sizes. The system architecture of the modular hardware block is capable of performing wide integer modulo arithmetic, where the arithmetic operations can be driven through programmable picocode (e.g., in module 204), and where the picocode can be written to perform elliptic curve cryptography scalar multiplications over generic finite fields, and/or where the field operations in a scalar multiplication can be scheduled optimally using the picocode. In one or more embodiments, the system architecture of the modular hardware block includes 3 128 by 128-bit multipliers and 3 256-bit accumulators. The arithmetic units are connected together to be able to implement Montgomery multiplication/Barrett reduction and are fully pipelined to have an iteration interval of accepting new operands for 128-bit field operations every clock cycle.

Figure 11:
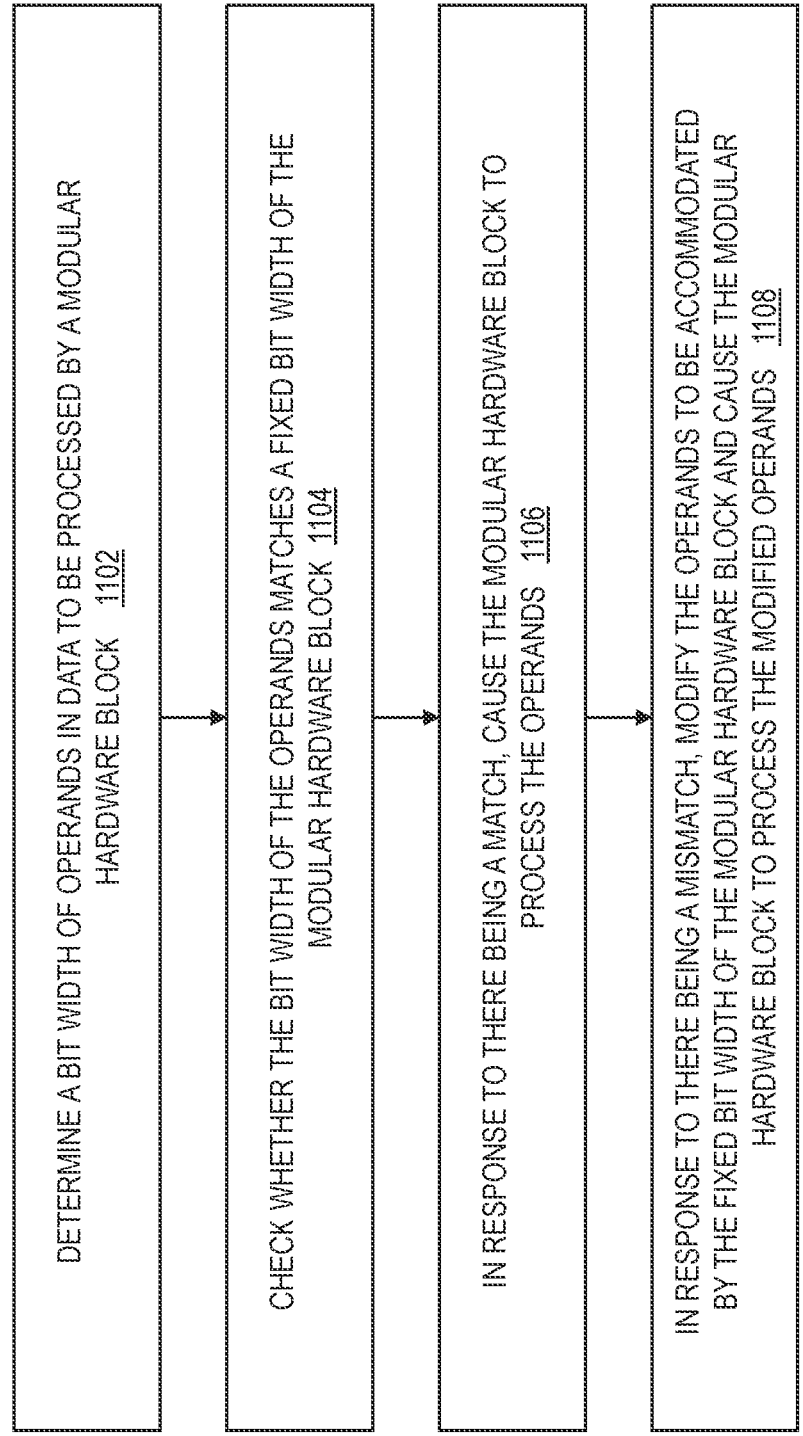
FIG. 11 depicts a flowchart of a computer-implemented process for providing, scheduling, and/or executing elliptic curve cryptography scalar multiplications in a generic field with heavy pipelining between field operations in accordance with one or more embodiments of the invention.

FIG. 11 is a flowchart of a computer-implemented process 1100 for providing, scheduling, and/or executing elliptic curve cryptography scalar multiplications in a generic field with heavy pipelining between field operations, thereby resulting in pipelines hardware acceleration of modular multiplication in accordance with one or more embodiments of the present invention. The computer-implemented process 1100 in FIG. 11 can be implemented using system 200 shown in FIG. 2.

At block 1102, module 204 is configured to determine a bit width of operands in data (e.g., point double data 222 and/or point add data 224) to be processed by a modular hardware block 210. At block 1104, module 204 is configured to check whether the bit width of the operands matches a fixed bit width (e.g., 128 bit width) of the modular hardware block 210. At block 1106, in response to there being a match, module 204 is configured to cause the modular hardware block 210 to process the operands. At block 1108, in response to there being a mismatch, module 204 is configured to modify the operands to be accommodated by the fixed bit width of the modular hardware block 210 and cause the modular hardware block 210 to process the modified operands.

Determining the bit width of the operands in the data to be processed by the modular hardware block 210 includes parsing the operands to obtain their bit width. Checking whether the bit width of the operands matches the fixed bit width of the modular hardware block 210 includes comparing the bit width of the operands to the fixed bit width (known in advance) of the modular hardware block 210. The modular hardware block 210 includes a first multiplication accumulator (MAC1), a second multiplication accumulator (MAC2), and a third multiplication accumulator (MAC3) in series. Modular hardware block 210 includes a series of multiplication accumulators (e.g., multiplication block 302 and its accumulator block 304) followed by a correction block 314. Modifying the operands to be accommodated by the fixed bit width of the modular hardware block 210 includes: comparing the bit width of the operands to the fixed bit width of the modular hardware block; dividing the bit width of the operands into a size that is accommodated by the fixed bit width, the dividing is in response to the bit width being larger than the fixed bit width; and increasing the bit width of the operands to the size that is accommodated by the fixed bit width, the increasing is in response to the bit width being smaller than the fixed bit width. The fixed bit width is a fixed size of a hardware structure responsible for holding an individual operand for processing.

A computer-implemented method of forming a modular hardware block for scalar multiplication is provided in accordance with one or more embodiments of the invention. A first multiplication accumulator (MAC1), a second multiplication accumulator (MAC2), and a third multiplication accumulator (MAC3) are coupled in series. An input of a correction block 314 is coupled to the third multiplication accumulator.

Each of the first, the second, and the third multiplication accumulators comprise a multiplication block (e.g., multiplication blocks 302) coupled to an accumulator block (e.g., accumulation blocks 304), the multiplication block having a fixed bit width. A data array 320 is coupled to the first multiplication accumulator (MAC1). A module 204 is coupled to the modular hardware block 210, the module 204 being configured to modify operands in data (e.g., point double data 222 and/or point add data 224) to accommodate a fixed bit width (e.g., 128 bit width) for the first multiplication accumulator (MAC1).

A modular hardware block 210 for scalar multiplication is provided in accordance with one or more embodiments of the invention. The modular hardware block 210 includes a first multiplication accumulator (MAC1), a second multiplication accumulator (MAC2), and a third multiplication accumulator (MAC3) coupled in series and each comprising a multiplication block coupled to an accumulator block, the multiplication block having a fixed bit width. A correction block 314 is coupled to the third multiplication accumulator (MAC3). A data array 320 is coupled to the first multiplication accumulator (MAC1), and a module 204 is coupled to the data array 320, the module 204 being configured to modify data to be accommodated and/or for accommodation by the fixed bit width.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
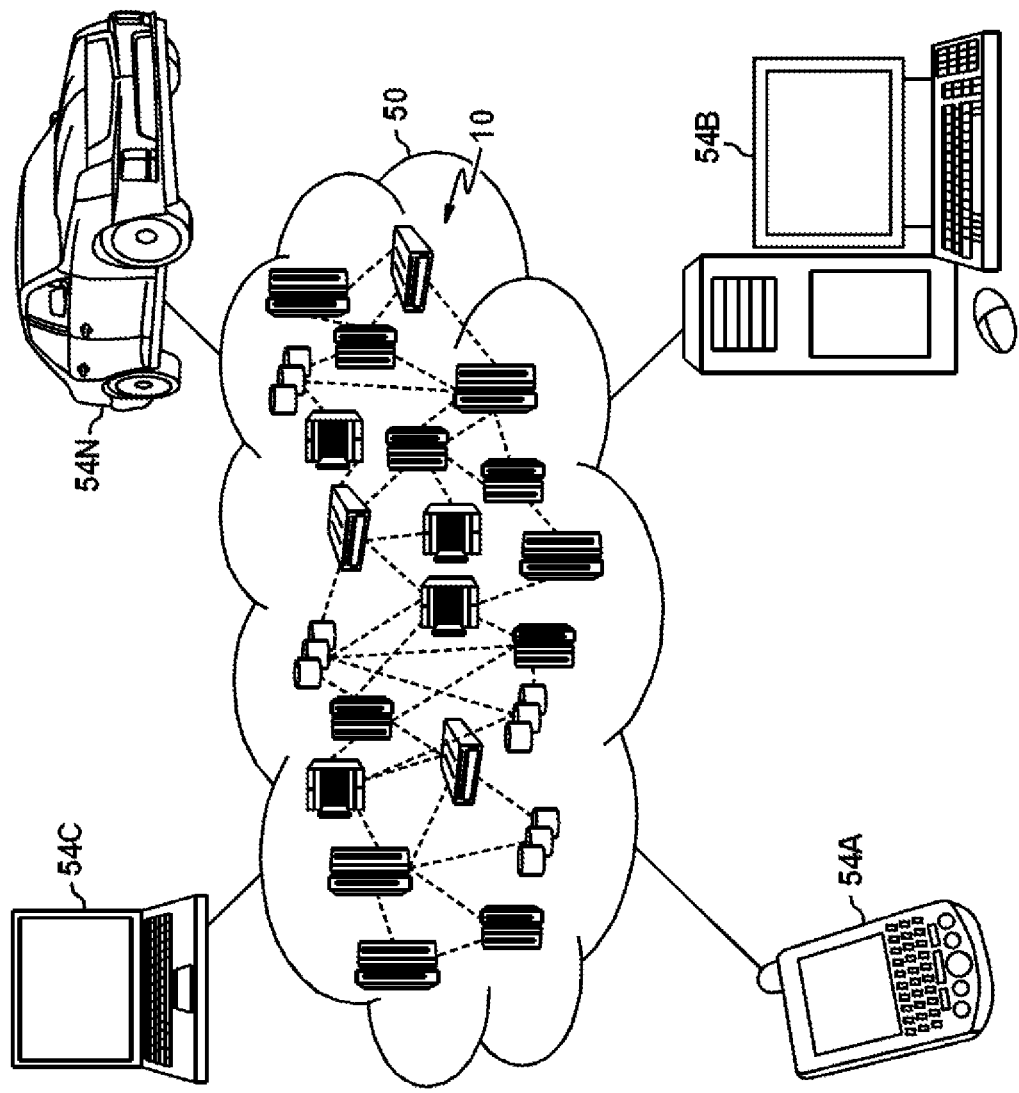
FIG. 12 depicts a cloud computing environment according to one or more embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
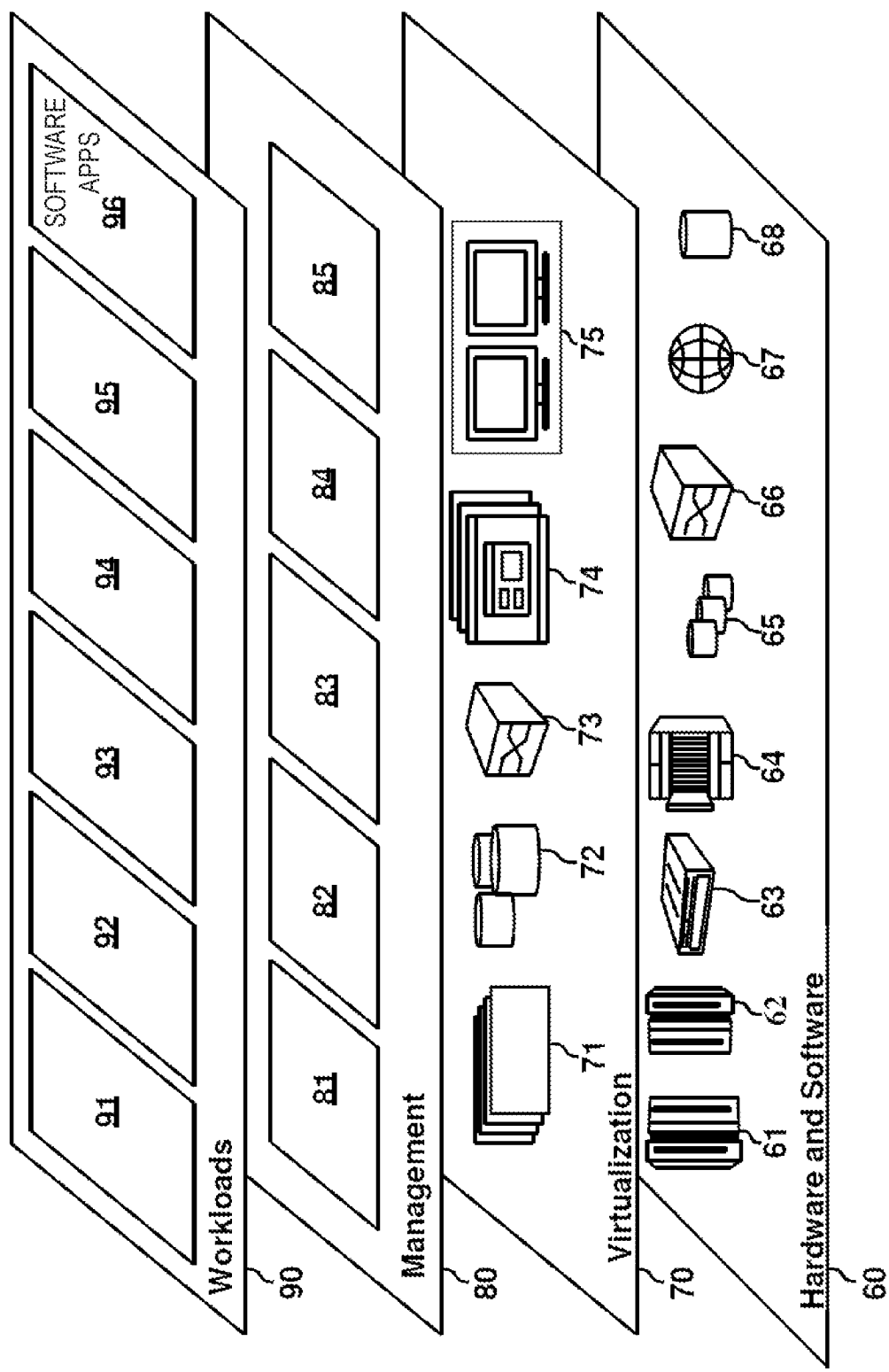
FIG. 13 depicts abstraction model layers according to one or more embodiments of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., module 204 as one or more software applications) implemented in workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining a bit width of operands in data to be processed by a modular hardware block; and
   in response to there being a mismatch between the bit width of the operands and a fixed bit width of the modular hardware block, modifying the operands to be accommodated by the fixed bit width of the modular hardware block and causing the modular hardware block to process the operands, wherein:
   the modular hardware block comprises a first multiplication accumulator connected in series to a second multiplication accumulator such that the second multiplication accumulator is connected in series to a third multiplication accumulator, the first and second multiplication accumulators being connected to a correction block;
   performing, by the first multiplication accumulator, a first operation in order to output first high order bits to the second multiplication accumulator and output first low order bits to the correction block;
   performing, by the second multiplication accumulator, a second operation in order to output second high order bits to the third multiplication accumulator; and
   performing by the third multiplication accumulator, a third operation in order to output third low order bits to the correction block.

2. The computer-implemented method of claim 1, wherein determining the bit width of the operands in the data to be processed by the modular hardware block comprises parsing the operands to obtain the bit width.

3. The computer-implemented method of claim 1 further comprising in response to there being a match between the bit width of the operands and the fixed bit width of the modular hardware block, causing the modular hardware block to process the operands, the match being determined by comparing the bit width of the operands to the fixed bit width of the modular hardware block.

4. The computer-implemented method of claim 1, wherein modifying the operands to be accommodated by the fixed bit width of the modular hardware block comprises:
   comparing the bit width of the operands to the fixed bit width of the modular hardware block;
   dividing the bit width of the operands into a size that is accommodated by the fixed bit width, the dividing in response to the bit width being larger than the fixed bit width; and
   increasing the bit width of the operands to the size that is accommodated by the fixed bit width, the increasing in response to the bit width being smaller than the fixed bit width.

5. The computer-implemented method of claim 1, wherein the fixed bit width is a fixed size of a hardware structure that holds an individual operand for processing.

6. A system comprising:
   a memory having computer readable instructions; and
   one or more processors for executing the computer readable instructions, the computer readable instructions controlling the one or more processors to perform operations comprising:
   determining a bit width of operands in data to be processed by a modular hardware block;
   in response to there being a mismatch between the bit width of the operands and a fixed bit width of the modular hardware block, modifying the operands to be accommodated by the fixed bit width of the modular hardware block and causing the modular hardware block to process the operands, wherein:
   the modular hardware block comprises a first multiplication accumulator connected in series to a second multiplication accumulator such that the second multiplication accumulator is connected in series to a third multiplication accumulator, the first and second multiplication accumulators being connected to a correction block;

performing, by the first multiplication accumulator, a first operation in order to output first high order bits to the second multiplication accumulator and output first low order bits to the correction block;

performing by the second multiplication accumulator, a second operation in order to output second high order bits to the third multiplication accumulator; and performing, by the third multiplication accumulator, a third operation in order to output third low order bits to the correction block.

7. The system of claim 6, wherein determining the bit width of the operands in the data to be processed by the modular hardware block comprises parsing the operands to obtain the bit width.

8. The system of claim 6, wherein the one or more processors perform operations further comprising in response to there being a match between the bit width of the operands and the fixed bit width of the modular hardware block, causing the modular hardware block to process the operands, the match being determined by comparing the bit width of the operands to the fixed bit width of the modular hardware block.

9. The system of claim 6, wherein modifying the operands to be accommodated by the fixed bit width of the modular hardware block comprises:
comparing the bit width of the operands to the fixed bit width of the modular hardware block;
dividing the bit width of the operands into a size that is accommodated by the fixed bit width, the dividing in response to the bit width being larger than the fixed bit width; and
increasing the bit width of the operands to the size that is accommodated by the fixed bit width, the increasing in response to the bit width being smaller than the fixed bit width.

10. The system of claim 6, wherein the fixed bit width is a fixed size of a hardware structure that holds an individual operand for processing.

11. A computer program product comprising a computer readable storage medium having program instructions embodied therewith, the program instructions executable by one or more processors to cause the one or more processors to perform operations comprising:
determining a bit width of operands in data to be processed by a modular hardware block; and
in response to there being a mismatch between the bit width of the operands and a fixed bit width of the modular hardware block, modifying the operands to be accommodated by the fixed bit width of the modular hardware block and causing the modular hardware block to process the operands, wherein:
the modular hardware block comprises a first multiplication accumulator connected in series to a second multiplication accumulator such that the second multiplication accumulator is connected in series to a third multiplication accumulator, the first and second multiplication accumulators being connected to a correction block;
performing, by the first multiplication accumulator, a first operation in order to output first high order bits to the second multiplication accumulator and output first low order bits to the correction block;
performing, by the second multiplication accumulator, a second operation in order to output second high order bits to the third multiplication accumulator; and
performing, by the third multiplication accumulator, a third operation in order to output third low order bits to the correction block.

12. The computer program product of claim 11, wherein determining the bit width of the operands in the data to be processed by the modular hardware block comprises parsing the operands to obtain the bit width.

13. The computer program product of claim 11, wherein the one or more processors perform operations further comprising in response to there being a match between the bit width of the operands and the fixed bit width of the modular hardware block, causing the modular hardware block to process the operands, the match being determined by comparing the bit width of the operands to the fixed bit width of the modular hardware block.

14. The computer program product of claim 11, wherein modifying the operands to be accommodated by the fixed bit width of the modular hardware block comprises:
comparing the bit width of the operands to the fixed bit width of the modular hardware block;
dividing the bit width of the operands into a size that is accommodated by the fixed bit width, the dividing in response to the bit width being larger than the fixed bit width; and
increasing the bit width of the operands to the size that is accommodated by the fixed bit width, the increasing in response to the bit width being smaller than the fixed bit width.

15. The computer program product of claim 11, wherein the fixed bit width is a fixed size of a hardware structure that holds an individual operand for processing.

16. A computer-implemented method of forming a modular hardware block for scalar multiplication, the method comprising:
connecting a first multiplication accumulator in series to a second multiplication accumulator such that the second multiplication accumulator is connected in series to a third multiplication accumulator; and
connecting an input of a correction block to the first and third multiplication accumulators, wherein:
the first multiplication accumulator performs a first operation in order to output first high order bits to the second multiplication accumulator and output first low order bits to the correction block;
the second multiplication accumulator performs a second operation in order to output second high order bits to the third multiplication accumulator; and
the third multiplication accumulator performs a third operation in order to output third low order bits to the correction block.

17. The computer-implemented method of claim 16, wherein each of the first, the second, and the third multiplication accumulators comprise a multiplication block coupled to an accumulator block, the multiplication block having a fixed bit width.

18. The computer-implemented method of claim 16, wherein a data array is coupled to the first multiplication accumulator.

19. The computer-implemented method of claim 16, wherein a module is coupled to the modular hardware block, the module configured to modify operands in data to accommodate a fixed bit width for the first multiplication accumulator.

20. A modular hardware block for scalar multiplication, the modular hardware block comprising:
- a first multiplication accumulator connected in series to a second multiplication accumulator such that the second multiplication accumulator is connected in series to a third multiplication accumulator and each of the first, second, and third multiplication accumulators comprising a multiplication block coupled to an accumulator block, the multiplication block having a fixed bit width;
- a correction block coupled to the first and third multiplication accumulators;
- a data array coupled to the first multiplication accumulator and the correction block; and
- a module coupled to the data array, the module being configured to modify data to be accommodated by the fixed bit width, wherein:
    - the first multiplication accumulator performs a first operation in order to output first high order bits to the second multiplication accumulator and output first low order bits to the correction block;
    - the second multiplication accumulator performs a second operation in order to output second high order bits to the third multiplication accumulator; and
- the third multiplication accumulator performs a third operation in order to output third low order bits to the correction block.

* * * * *